United States Patent [19]

Senga et al.

[11] 3,877,444
[45] Apr. 15, 1975

[54] INTAKE SYSTEM FOR AN INTERNAL COMBUSTION ENGINE

[75] Inventors: Akihisa Senga, Asaki; Yoshiaki Hidaka, Wako, both of Japan

[73] Assignee: Honda Giken Kogyo Kabushiki Kaisha, Tokyo, Japan

[22] Filed: July 2, 1973

[21] Appl. No.: 375,503

[30] Foreign Application Priority Data

July 4, 1972 Japan................................ 47-78302

[52] U.S. Cl. .......... 123/75 B; 123/127; 123/32 SP; 123/122 AB; 123/122 AC
[51] Int. Cl. ...................... F02b 19/10; F02b 19/18
[58] Field of Search... 123/122 A, 122 AB, 122 AC, 123/75 B, 52 M, 325 T, 325 PA, 127

[56] References Cited
UNITED STATES PATENTS

| | | | |
|---|---|---|---|
| 1,285,916 | 11/1918 | Bradburn................ | 123/122 AB |
| 2,011,992 | 8/1935 | Aseltine ................ | 123/75 B |
| 2,166,398 | 7/1939 | Doman ................... | 123/122 A |
| 2,244,214 | 6/1941 | Pescara .................. | 123/75 B |
| 3,092,088 | 6/1963 | Goossak .................. | 123/325 PA |
| 3,171,393 | 3/1965 | Platner ................... | 123/122 AB |
| 3,659,564 | 5/1972 | Suzuki .................... | 123/325 PA |

Primary Examiner—Charles J. Myhre
Assistant Examiner—Ronald B. Cox
Attorney, Agent, or Firm—Lyon and Lyon

[57] ABSTRACT

An intake system for an engine of the type having an auxiliary combustion chamber associated with each main combustion chamber. The intake system includes a first system of passageways for distributing a lean air-fuel mixture to the main combustion chambers and a second system of passageways for distributing a rich air-fuel mixture to the auxiliary combustion chambers. The first passageway system includes a two throat carburetor arrangement, a single heating chamber and distribution passageways. The second passageway system includes a single throat carburetor extending down to a heating chamber between the two throats of the main carburetor and passageways connecting the heating chamber with the auxiliary combustion chambers. The heating chamber for each of the passageway systems are positioned on the exhaust manifold system in order that the fuel will be properly vaporized. The passageways between the second heating chamber and the auxiliary combustion chambers are placed in association with the exhaust manifold system for further heating of the rich air-fuel mixture.

3 Claims, 2 Drawing Figures

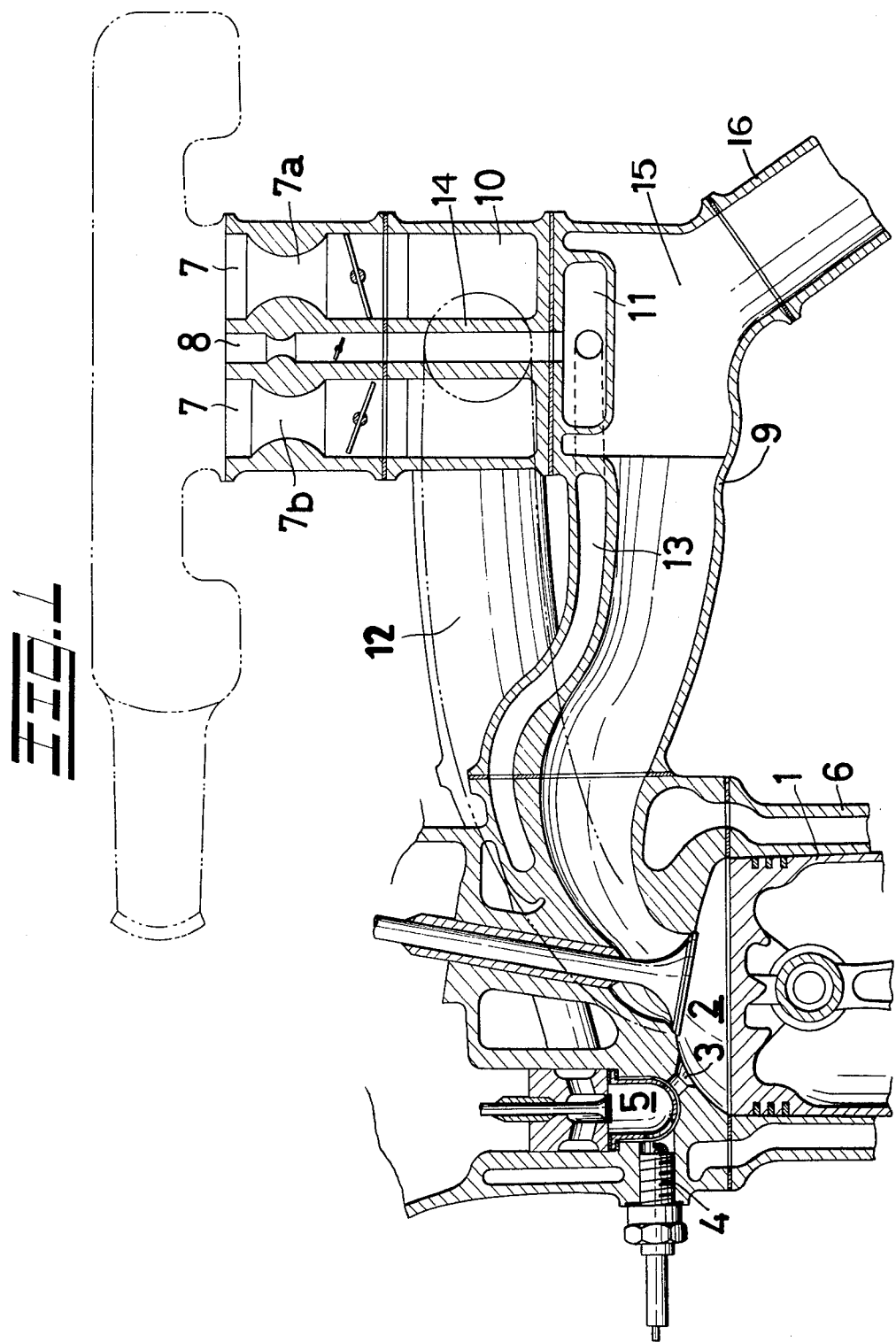

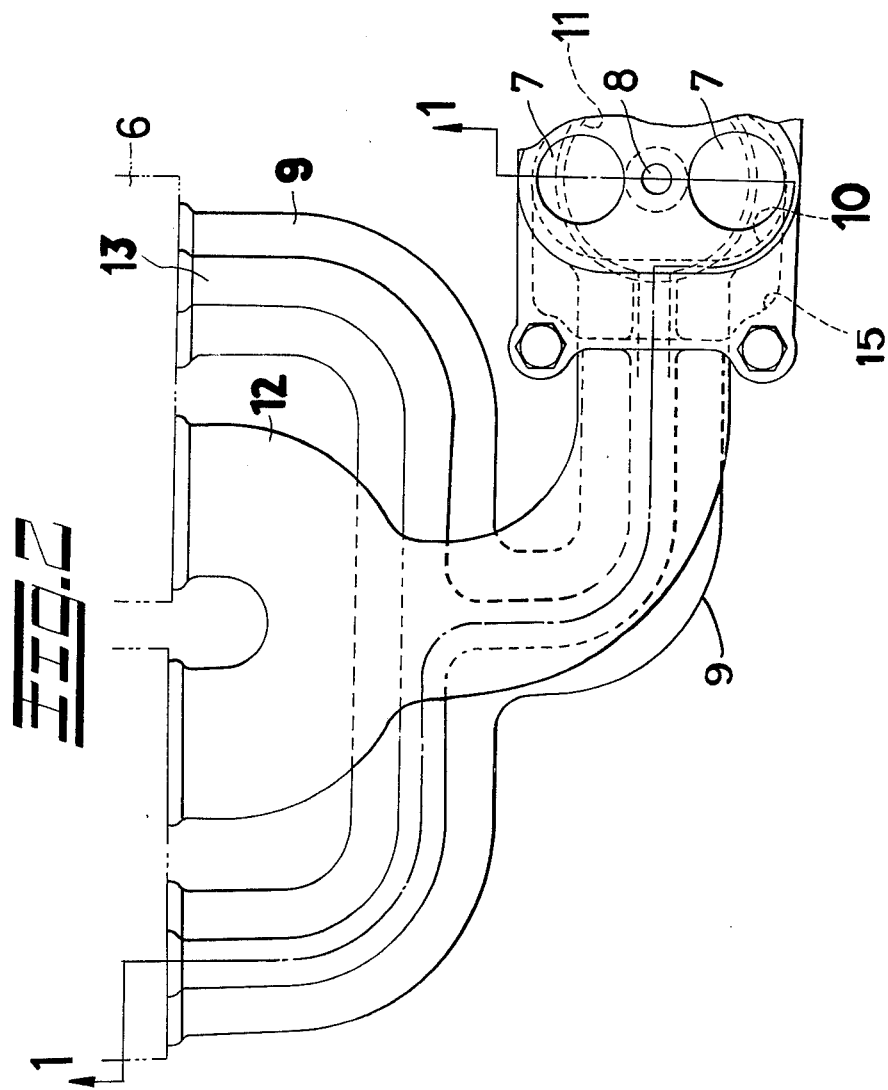

INTAKE SYSTEM FOR AN INTERNAL COMBUSTION ENGINE

This invention is directed to an intake system to be used with an internal combustion engine of the type wherein an auxiliary combustion chamber is associated with each main combustion chamber. More specifically, this invention is directed to an intake system for a plurality of combustion chambers wherein heat from the exhaust manifold system is employed to insure proper vaporization within the intake passages.

Intake systems for internal combustion engines of the type having auxiliary combustion chambers include passageways associated with the auxiliary combustion chambers for conveying a rich air-fuel mixture thereto. The auxiliary combustion chambers are relatively small in comparison with the main combustion chambers and consequently a smaller volume of rich air-fuel mixture is transmitted to these auxiliary combustion chambers through these passageways. Because of the greater amount of fuel mixed with the air and because of the low volume of flow, the mixture delivered to the auxiliary combustion chambers tends to separate with the fuel condensing in the passageways. Such condensation prevents the engine from operating at its maximum efficiency. It has also been found that the lean air-fuel mixture is not always completely vaporized before it reaches the main combustion chambers. When the fuel in each of the mixtures is not properly vaporized, the combustion process cannot be properly performed. As a result, fuel consumption increases and incomplete combustion occurs. Incomplete combustion results in dirty emissions which defeat one of the most important advantages that may be realized by these types of engines. These engines have been found to be capable of operating without producing a great deal of air pollution.

The present invention employs a system whereby the rich air-fuel mixture associated with the auxiliary combustion chambers and the lean air-fuel mixture associated with the main combustion chambers may be completely vaporized for maximum combustion efficiency and cleanliness. The passageways associated with the auxiliary combustion chambers are in direct thermal association with the exhaust manifold. Further, the heating chamber has a substantial amount of surface area associated with the exhaust manifold system for direct heat transfer. In this way, the heat from the engine exhaust will insure proper vaporization of the fuel within the rich air-fuel mixture. The carburetor for the auxiliary combustion chambers is also positioned between the carburetors for the main combustion chambers to aid in heat control.

The intake passageways associated with the main combustion chambers are not positioned to receive as much heat from the exhaust manifold system as are the passageways associated with the auxiliary combustion chambers. However, some heat is provided to prevent condensation of the fuel. A heating chamber in direct communication with the carburetor is placed in sufficient association with the exhaust manifold system that the intake mixture will receive enough heat to prevent such condensation.

Accordingly, it is an object of the present invention to provide an intake system for an internal combustion engine of the type employing an auxiliary combustion chamber associated with each of a plurality of main combustion chambers wherein the rich air-fuel mixture being transported to the auxiliary combustion chambers is heated substantially and the lean air-fuel mixture associated with the main combustion chambers is moderately warmed.

Another object of the present invention is to provide an intake system for distributing a rich air-fuel mixture and a lean air-fuel mixture to a plurality of combustion chambers wherein these mixtures are heated by the exhaust system.

Other and more detailed objects and advantages will appear hereinafter.

FIG. 1 is a sectional side view of an internal combustion engine taken along line 1—1 of FIG. 2 and illustrating a preferred embodiment of this invention.

FIG. 2 is a plan view illustrating the distribution arrangement to the cylinders.

Referring to the drawings, a combustion chamber arrangement of the type having an auxiliary combustion chamber associated with the main combustion chamber is disclosed. A main combustion chamber 2 is provided above a piston 1. Each such main combustion chamber 2 is positioned within the cylinder block of the engine 6. The main combustion chamber 2 has a ported inlet passage and a ported exhaust passage. An auxiliary combustion chamber 5 is provided in the head near the main combustion chamber 2. The auxiliary combustion chamber 5 is in communication with the main combustion chamber 2 through a torch nozzle 3. Associated with the auxiliary combustion chamber 5 is a spark plug 4. A number of such combustion chamber systems may be employed within the same engine block and head.

The combustion process proceeds by first drawing a rich air-fuel mixture into the auxiliary combustion chamber 5 and a lean air-fuel mixture into the main combustion chamber 2. The rich air-fuel mixture within the auxiliary combustion chamber 5 is ignited by the spark plug 4. The burning fuel is thereby injected through the torch nozzle into the main combustion chamber 2. This injection of the burning fuel brings about combustion of the lean air-fuel mixture within the main combustion chamber 2. Following combustion, the gases are exhausted through the exhaust passageway into the exhaust manifold 9.

Air is brought into the main combustion chamber system through the main carburetor 7 having throats 7a and 7b. An auxiliary carburetor 8 is provided between the main carburetor throats 7a and 7b for the auxiliary combustion chamber 5. The main carburetor 7 is set to provide a lean air-fuel mixture and the auxiliary carburetor 8 is set to provide a rich air-fuel mixture. Below the carburetor 7, a heating chamber 10 is provided. The heating chamber 10 is common to both throats 7a and 7b. The heating chamber 10 has at least one port through which the lean air-fuel mixture may pass into main intake passages 12. The main intake passage 12 extends from the main heating chamber 10 toward the engine 6 where the passage 12 splits to meet the intake passages within the engine head which direct the lean air-fuel mixture to two main combustion chambers 2.

An auxiliary heating chamber 11 is provided beneath the main heating chamber 10 and is in communication with the auxiliary carburetor 8, through the conduit 14 which passes through the center of the main heating chamber 10. This auxiliary heating chamber 11 is substantially larger than the throat of the auxiliary carburetor 8 and the passageways to the auxiliary combustion chambers 5 so that the rich air-fuel mixture will not quickly and immediately pass therethrough. The auxiliary heating chamber 11 also includes at least one port through which the air-fuel mixture may pass for distribution to the engine 6. An auxiliary intake passageway 13 extends between the auxiliary heating chamber 11 and the auxiliary combustion chambers 5. The auxiliary intake passageway 13 extends along the exhaust manifold 9 in order that heat may be transferred from the exhaust manifold 9 to the auxiliary intake passage 13 to prevent condensation of the fuel from the rich mixture along the passageway 13. The auxiliary intake passageway 13 splits so that it may be directed to two separate auxiliary combustion chambers 5 and so that it might follow the exhaust manifold 9 which also splits to meet the exhaust passageways of two separate main combustion chambers 2.

The exhaust manifold 9 directs hot exhaust gases into a central chamber 15 and then exhausts them through an outlet 16. This central chamber is positioned in direct contact with the main heating chamber 10 and the auxiliary heating chamber 11. The auxiliary heating chamber 11 is centered beneath the main heating chamber 10 and is of circular rather than oval cross-section. Consequently, the exhaust manifold 9 extends about the auxiliary heating distribution chamber 11 to approach the main heating chamber 10 as can be seen in FIG. 2. Thus, a substantial heat transfer surface is provided between the auxiliary heating chamber 11 and the exhaust manifold 9. A lesser heat transfer surface is provided between the exhaust manifold 9 and the main heating chamber 10. As a result, the rich air-fuel mixture is heated substantially by the exhaust in the exhaust manifold 9 while the lean air-fuel mixture within the main heating chamber 10 is lightly warmed.

Having fully described the preferred embodiment of the present invention, it is to be understood that the invention is not to be limited to the details herein set forth but is of the full scope of the appended claims.

What is claimed is:

1. An intake system for an internal combustion engine having an auxiliary combustion chamber associated with each main combustion chamber, comprising: a main carburetor having two parallel throats; an auxiliary carburetor located between said two throats; a main heating chamber in communication with said main carburetor; an auxiliary heating chamber in communication with said auxiliary carburetor; an exhaust manifold in juxtaposition with said main heating chamber; the auxiliary heating chamber being positioned within said exhaust manifold; a conduit connecting the auxiliary carburetor to the auxiliary heating chamber, said conduit passing through the main heating chamber; passageway means from said main heating chamber to the main combustion chambers of the engine; and passageway means from said auxiliary heating chamber to the auxiliary chambers of the engine.

2. The system of claim 1 wherein said auxiliary heating chamber is substantially larger in diameter than said conduit.

3. The system of claim 1 in which the latter said passageway means is disposed in thermal communication with said exhaust manifold throughout the entire length of said passageway.

* * * * *